Sept. 10, 1957            H. B. LAW            2,805,986
METHOD OF MAKING FINE MESH SCREENS
Filed Jan. 11, 1952
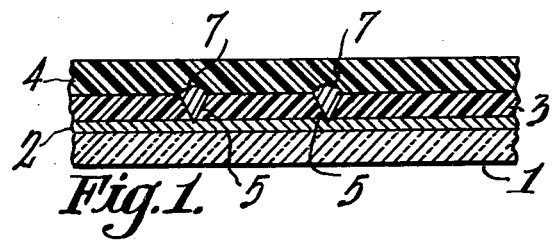
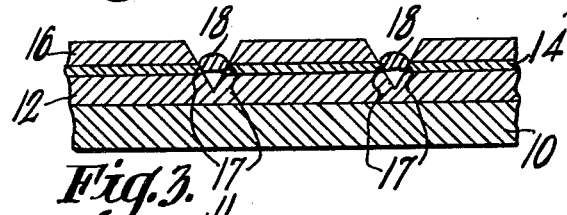
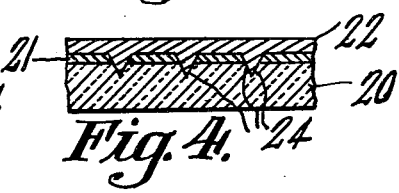
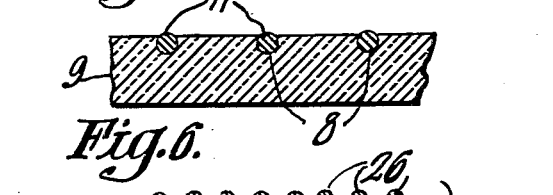
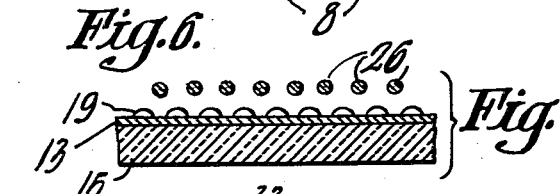
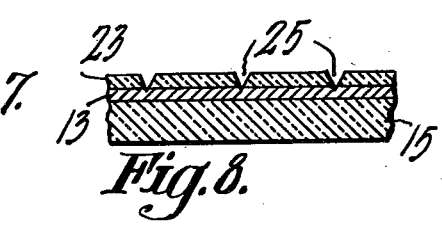
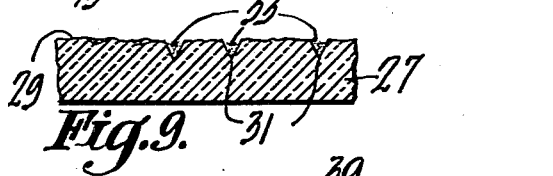
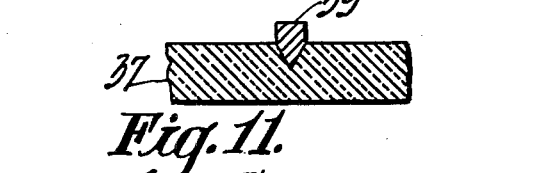
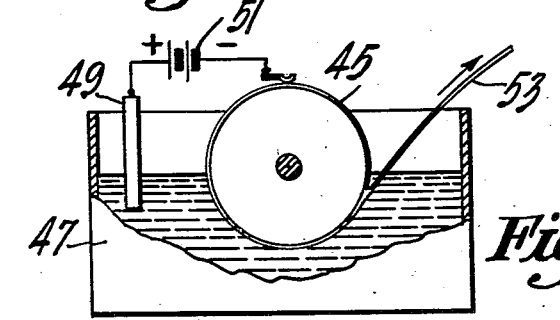
INVENTOR
HAROLD B. LAW
BY
William A. Zalesak
ATTORNEY

United States Patent Office 2,805,986
Patented Sept. 10, 1957

2,805,986

METHOD OF MAKING FINE MESH SCREENS

Harold B. Law, Princeton, N. J., assignor, by mesne assignments, to the United States of America as represented by the Secretary of the Army Application January 11, 1952, Serial No. 266,009

1 Claim. (Cl. 204—11)

My invention pertains to methods and apparatus for producing fine mesh screens and particularly to methods of producing masters from which fine mesh screens may be fabricated.

The image orthicon pickup tube is one example of apparatus which requires a fine mesh screen of large open area and high uniformity for proper operation. In the operation of the image orthicon, an electron image of the scene to be transmitted is focused on a metal screen within the tube. To avoid seeing the screen superimposed on the final picture, it is desirable to use a screen of such fine mesh that it cannot be resolved.

Screens of fine mesh approaching the order of fineness but not the quality of those made according to the present invention have heretofore been made of woven wire or formed by electroplating conductive parts of a pattern made with the aid of light sensitive emulsions. These prior screens have been found inadequate and only partially satisfactory for use in image orthicon tubes. Some of these screens have been of a mesh of four hundred to the inch but whether of the woven type or of the electrodeposited type, irregularities and blemishes render the results unsatisfactory. In addition, such screens have a very low light or electron transmission factor. A necessary compromise of these results has been accomplished by employing screens of only two hundred and thirty mesh to the inch as thereby a greater uniformity of weave is obtained. These screens may be etched to sixty percent transmission. In a low mesh screen of this type the picture is materially limited by the superimposed screen pattern.

An improved method of making fine mesh screens is disclosed in my U. S. Patent 2,529,086. However, the invention disclosed therein has certain features which make it undesirable for mass production of screens from a single master. The invention described herein is intended to provide a more simple and economical method of making fine mesh screens and particularly a method which will lend itself to mass production techniques.

Accordingly the principal object of my invention is to provide a novel method for the production of uniform, fine mesh screens.

Another object of my invention is to provide a novel method of producing a fine mesh screen master for mass production of fine mesh screens.

A further object of my invention is to provide a novel method of producing a master for the manufacture of fine mesh screens having good uniformity and large transmission area.

In general, I accomplish my invention, according to one method, by combining alternate layers of either different metals or of conductive and non-conductive materials to form a multi-layered matrix for the screen master. The pattern for the master is ruled or otherwise impressed through the non-conductive and into the conductive layer or through one metallic layer to the next, which is chosen because of its favorable plating qualities. Then a copper, or other metallic or conductive, master is plated in the grooves formed by ruling the master pattern. The appropriate layers of the matrix are then removed from beneath the plated master to expose the tips of the individual wires which had been plated in the grooves. The final screen product is formed by electroplating on the exposed tips of the master screen.

An alternative method of preparation of the screen master broadly comprises ruling a master pattern through a laminated structure and exposing portions of a conductive layer. The exposed portions constitute the master on which screens may be continuously deposited.

Another method comprises deposition of conductive material on a base member which has the grooves of a master pattern ruled therein. Only the material in the grooves is thick enough for plating screens thereon.

My invention is described in greater detail in connection with the drawings wherein:

Figs. 1 and 2 are sectional views of one embodiment of a screen master made according to the teachings of my invention;

Figs. 3 and 4 are sectional views of the embodiments of my invention;

Figs. 5 and 6 are sectional views of still another embodiment of my invention;

Figs. 7 and 8 are sectional views of two forms of my invention which utilize silicon oxide as a component agent;

Fig. 9 is a sectional view of another form of my invention;

Figs. 10 and 11 are sectional views of an additional form of my invention;

Fig. 12 is a sectional view of another form of my invention; and,

Fig. 13 is a side view of apparatus using a master screen made according to my invention for mass production of fine mesh screens.

Referring to Fig. 1, there is shown a glass or other non-conductive plate 1 which forms a base on which a coating 2 of conductive material is applied. One example of a suitable conductive material is a material such as tin chloride. The next lamination in building up the matrix is a coating 3 of wax or other non-conductor, which is deposited on the conductive coating and then the pattern 5 of the master is ruled or otherwise impressed in the wax layer 3 by means of a diamond point or other suitable means. The pattern is ruled just through the wax to the conductive layer 2 so that when, subsequently, the master 7 which may be formed of copper, or some other suitable conductive material, metallic or otherwise, is applied to the V grooves of the pattern, it will adhere to the area of the conductive layer 2 exposed by the diamond point.

For the purpose of giving strength to the original wax layer 3 and its embedded copper master 7, a thick layer of wax 4 of the same or any suitable kind is applied over the master 7 which has been plated into the grooves of the ruled pattern. If desired, the copper or the metal master 7 may be plated further to a thickness sufficient to provide the necessary strength. To expose the area of the master to be used and prepare it for further operations, the glass base and conductive layer are removed by thermal shock such as cooling with liquid air and the final master appears in the form shown in Fig. 2. A metal base on which copper or any other desired metal will plate may be substituted for the glass base 1 and conductive coating 2.

To use the master, copper is plated in any conventional manner on the exposed areas 6 which are very narrow and approximate the width of the diamond point which was used to rule the master pattern. Because of the narrow width of the exposed master, substantially round wires will be plated, or otherwise deposited, thereon and will be easily stripped therefrom. When material is plated on such a small starting point, it will spread substantially evenly in all directions and substantially round wires will result. A parting medium of light oil may be used in conjunction with the master if necessary. The oil is applied to the surface of the master before plating so that the bond formed with the plated metal is weak and stripping of the plated screen is easily effected.

A second embodiment of my invention is shown in Fig. 3, wherein the matrix is composed of alternate layers of different conductive materials or of different metals, for example, copper and aluminum arranged in combination. The matrix comprises, in one suitable arrangement, a comparatively heavy base plate 10 of copper, a layer 12 of aluminum, a comparatively thin lamination 14 of copper, and a final coating 16 of aluminum. As shown, the master pattern is ruled through the top layers 16 and 14 of aluminum and copper, respectively, and into the layer 12 of aluminum so that the thin copper layer 14 is exposed in the V grooves at 17. The thin copper layer thus exposed is the screen master and screens are produced by plating copper 18 thereon. The copper layer 14 is so thin (ca. 1000 A.) that the screen wires are considerably stronger than the bond with the master so that the plated screen is easily stripped therefrom without requiring a parting medium.

My invention may also be practiced with transparent conductive materials which may be readily electroplated. An example of such suitable material is tin chloride; other transparent conductive materials may also be utilized.

One such embodiment of my invention is shown in Fig. 4 wherein a glass base plate 20 is coated with a non-conductive masking material 21 and then a master pattern is ruled through the mask and into the glass. A layer of conductive material 22 is then deposited on the masking layer and in the ruled grooves 24. When the masking coating is removed, only the grooves retain the conductive material on which screens may be plated.

Another method of carrying out my invention is shown in Figs. 5 and 6 and comprises embedding a conductive screen 8 of the desired type in a plastic or other non-conductive base 9 and then removing a portion of the plastic to expose a very small area 11 of the screen which is then used as a master on which other screens may be plated.

According to another method, using a transparent conductive coating material as shown in Figs. 7 and 8, a conductive coating 13 of tin chloride, for example, is applied to a base plate 15 and then either a patterned layer 19 of silicon oxide is evaporated on the coating through a screen 26 or a solid layer 23 of silicon oxide is evaporated on and then grooves 25 of a screen pattern are ruled therethrough to the conducting layer 13. In either case, the entire assembly is then heated in air to convert the silicon oxide to silica and thus form a permanent bond between the silica and the conductive coating. The heating produces a system of insulating squares between lines of conductive material which is then used for screen plating.

Another method of depositing the master in the grooves of a ruled screen pattern is disclosed in my above-mentioned U. S. Patent 2,529,086. According to such method, a thin layer of metal is sputtered on the surface of the glass plate and into the grooves of the pattern ruled thereon. By rubbing the surface, the metal is removed only from the surface of the glass and not from the grooves where it remains to act as the cathode in a plating process. This rub-off process exposes the master to excessive scratching which tends to round off the sharp edges of the grooves until the sputtered metal cannot be selectively removed from the surface and left in the grooves. This problem may be solved, in one instance, as shown in Fig. 9 wherein the non-conductive base plate 27 has a rough surface. Metal or other conductive material is sputtered or otherwise deposited on the surface 29 of the base member 27 and into the grooves 31, in such a fashion that only the metal 33 in the grooves will be of sufficient thickness and have the proper resistance to be conductive in an electroplating process. The metal deposited on the surface 29 will not be of a sufficient thickness for that purpose.

Another method of avoiding the rub-off process is illustrated in Fig. 10 and consists of evaporating a coating of aluminum 35 on a glass base 37 at such an angle that the atoms of aluminum strike the glass at grazing incidence and aluminum is thereby deposited on the surface of the glass and not in the grooves. A second metal, copper for example, or other conductive material, is then deposited in a uniform layer 39 on the surface of the glass plate 37 and in the grooves. The entire structure is immersed in a weak sodium hydroxide solution which dissolves the aluminum and thus breaks up the copper associated with it leaving only the copper in the grooves which thereby constitutes the plating master. A portion of the final master is shown in Fig. 11.

When the sputtering process is used, it is found to have poor throwing power, i. e. deposition of metal in recesses is poor. Improved operation may be effected, as is indicated in Fig. 12, by lightly sealing a silica screen 41 to a non-conductive plate 42 and then depositing metal 44 on the entire structure. Due to poor throwing power, metal will be thick enough to be conducting only on the top of the silica screen.

Any of the above described embodiments may be utilized for mass production of fine mesh screens. One method shown in Fig. 13 comprises forming the master into a cylinder 45 or mounting it on a drum. The cylinder or drum is suitably positioned so that it may be rotated and the elements of the master may be dipped into an electroplating bath 47 of a suitable solution containing ions of the metal to be plated. A bar 49 of the pure plating metal is provided in the bath 47 and forms the anode in the plating process. The bar 49 is connected to the positive terminal of a source 51 of D. C. voltage. The master 45 is connected to the negative terminal of the source 51 and constitutes the cathode in the process.

As the master 45 is rotated through the bath, a screen 53 is plated on the master pattern. The cylinder is rotated at a speed suitable for depositing a predetermined thickness of metal. As the screen 53 is deposited and the master cylinder continues to rotate, the screen is stripped from the master and processed further as desired.

From the foregoing discussion, it is clear that my invention provides novel methods for producing a master for mass production of fine mesh screens of good uniformity and large transmission area.

What I claim is:

A fine mesh screen master comprising a laminated structure having alternating layers of conductive material, said structure comprising a conductive base member having thereon a first layer of aluminum, a layer of copper and a second layer of aluminum in the order recited, said layers of aluminum being of the type that prevents electrodeposition thereon, said layer of copper being a material that receives electrodeposition thereon, and V-grooves in selected areas of said master, said V-grooves extending through said second layer of aluminum, through said layer of copper and into said first layer of aluminum whereby said copper is exposed in an area removed from the apex of said V-grooves.

References Cited in the file of this patent

UNITED STATES PATENTS

| | | |
|---|---|---|
| 313,805 | Callow | Mar. 10, 1885 |
| 625,205 | Sanders | May 16, 1899 |

(Other references on following page)

UNITED STATES PATENTS

| | | |
|---|---|---|
| 1,515,658 | Cole | Nov. 18, 1924 |
| 1,563,731 | Ducas | Dec. 1, 1925 |
| 2,028,013 | Reilly | Jan. 14, 1936 |
| 2,166,366 | Norris | July 18, 1939 |
| 2,166,367 | Norris | July 18, 1939 |
| 2,221,502 | van de Pol | Nov. 12, 1940 |
| 2,226,381 | Norris | Dec. 24, 1940 |
| 2,226,382 | Norris | Dec. 24, 1940 |
| 2,230,868 | Kuhlman | Feb. 4, 1941 |
| 2,246,380 | Norris | June 17, 1941 |
| 2,250,435 | Norris | July 22, 1941 |
| 2,279,567 | Holman | Apr. 14, 1942 |
| 2,296,616 | Koller | Sept. 22, 1942 |
| 2,415,361 | Mell | Feb. 4, 1947 |
| 2,459,129 | Gresham et al. | Jan. 11, 1949 |
| 2,506,164 | Morse | May 2, 1950 |
| 2,529,086 | Law | Nov. 7, 1950 |
| 2,650,900 | Holman | Sept. 1, 1953 |
| 2,666,008 | Enslein et al. | Jan. 12, 1954 |

FOREIGN PATENTS

| | | |
|---|---|---|
| 12,382 | Great Britain | of 1892 |
| 481,785 | Great Britain | Mar. 17, 1938 |